(12) United States Patent
Kulatunga

(10) Patent No.: US 12,114,619 B2
(45) Date of Patent: Oct. 15, 2024

(54) VERTICAL FARMING/GARDENING SYSTEMS AND METHODS OF GROWING AND/OR DEHYDRATING THEREWITH

(71) Applicant: N. Athula Kulatunga, Munster, IN (US)

(72) Inventor: N. Athula Kulatunga, Munster, IN (US)

( * ) Notice: Subject to any disclaimer, the term of this patent is extended or adjusted under 35 U.S.C. 154(b) by 152 days.

(21) Appl. No.: 17/894,578

(22) Filed: Aug. 24, 2022

(65) Prior Publication Data

US 2023/0067626 A1     Mar. 2, 2023

Related U.S. Application Data

(60) Provisional application No. 63/236,751, filed on Aug. 25, 2021.

(51) Int. Cl.
*A01G 31/04* (2006.01)
*A01C 21/00* (2006.01)
*A01G 7/06* (2006.01)
*G05B 19/042* (2006.01)

(52) U.S. Cl.
CPC .......... *A01G 31/045* (2013.01); *A01C 21/007* (2013.01); *A01G 7/06* (2013.01); *G05B 19/042* (2013.01); *G05B 2219/2231* (2013.01)

(58) Field of Classification Search
CPC ............ A01G 31/045; A01G 2031/006; A01G 31/06; A01G 31/02; A01G 27/005; A01G 27/001; A01G 27/006; A01G 27/02; A01G 27/06; A01G 31/042; A01G 31/047
See application file for complete search history.

(56) References Cited

U.S. PATENT DOCUMENTS

| 4,317,308 A * | 3/1982 | Derrick ................. A01G 18/69 47/65 |
| 10,112,814 B1 * | 10/2018 | Shelor .................... A01G 22/00 |
| 2014/0182197 A1 * | 7/2014 | Chung ................ A01G 31/045 47/1.7 |
| 2017/0118922 A1 * | 5/2017 | Sherertz ............... A01G 31/042 |

(Continued)

FOREIGN PATENT DOCUMENTS

| CN | 101647386 A * | 2/2010 |
| CN | 108651071 A * | 10/2018 |

(Continued)

*Primary Examiner* — Trinh T Nguyen
(74) *Attorney, Agent, or Firm* — Hartman Global IP Law; Gary M. Hartman; Domenica N. S. Hartman

(57) ABSTRACT

Vertical farming/gardening systems and methods of using. The systems include a track defining a path in which a change in elevation occurs, buckets pivotally secured to the track to travel along the path, and a moving mechanism for moving the buckets along the path. A first bucket has a cavity containing either a growing medium capable of supporting plants growing within the cavity or a solar collector for dehydrating plants within the cavity. One or more service stations located along the path of the track perform actions on the growing medium or the plants within the cavity of the first bucket as the first bucket travels along the path. One or more sensors analyze the growing medium or plants within the cavity of the first bucket. A master control unit controls the system including travel of the buckets along the path of the track.

20 Claims, 7 Drawing Sheets

(56) References Cited

U.S. PATENT DOCUMENTS

| | | | |
|---|---|---|---|
| 2019/0335681 A1* | 11/2019 | Oberthier | B65G 23/24 |
| 2021/0002073 A1* | 1/2021 | Schuler | E06B 3/67365 |
| 2023/0157220 A1* | 5/2023 | Daoust | A01G 31/042 |
| | | | 47/65 |
| 2023/0345892 A1* | 11/2023 | Bishop | A01G 31/047 |

FOREIGN PATENT DOCUMENTS

| | | | | |
|---|---|---|---|---|
| WO | WO-2016061672 A1 * | 4/2016 | | A01G 25/16 |
| WO | WO-2019090313 A1 * | 5/2019 | | A01G 27/003 |

* cited by examiner

VERTICAL FARMING/GARDENING SYSTEMS AND METHODS OF GROWING AND/OR DEHYDRATING THEREWITH

CROSS REFERENCE TO RELATED APPLICATIONS

This application claims the benefit of U.S. Provisional Application No. 63/236,751 filed Aug. 25, 2021, the contents of which are incorporated herein by reference.

BACKGROUND OF THE INVENTION

The present invention generally relates to agriculture and agricultural practices and systems associated therewith. The invention particularly relates to systems and methods for vertical farming/gardening that are at least partially autonomous.

It has been estimated that planet-wide population growth rates may require doubling or even tripling of current agricultural production levels within the next thirty to forty years. Various challenges exist in achieving such production levels with traditional farming techniques. For example, horizontal farming is heavily reliant on human labor, yet much of the work force includes migrating agricultural workers that are not available in all locations and/or at various times of the year. Securing and organizing such labor has been an ongoing concern even at current production levels. In addition, horizontal farming techniques themselves require large tracts of land. However, land is a limited resource and growing cities continue to compete with commercial agriculture. Further, large tracts of land require movement of the workers and/or farming equipment through the fields. Therefore, increasing production results in an increase in labor (e.g., more workers and/or longer work hours), resources (e.g., more equipment and fuel), and pollution (e.g., burning fossil fuels, fertilizer runoff). Horizontal farming may further be limited by an inability to recover and reuse fertilizers and soil nutrients, high levels of water evaporation, and a dependence on atmospheric conditions for suitable soil temperatures and natural water supplies. Changing climates around the world may further exacerbate these challenges and may create additional challenges as well such as reductions in growing seasons for certain locations.

In addition to the above challenges, current horizontal farming techniques have had notable adverse impacts on human health due at least in part to certain chemicals used in commercial food production. These adverse health effects have led to changes in consumer consumption including preferences for organic produce, non-genetically modified produce, and plant-based meat alternatives, even when such preferences include higher costs to the consumers. However, such preferences may be difficult for individuals to implement due to a general lack of public knowledge as to the origins of food products. Horizontal farming techniques also have a significant impact on the environment, including substantial water usage, introduction of foreign materials and/or abnormal quantities of materials (e.g., fertilizer runoff), and pollution.

In view of the above, any solutions that reduce water usage and/or land use are desirable. Agriculture 4.0 refers to a current transition that is underway in the agricultural industry. In particular, the industry is emphasizing a greater focus on precision agriculture, automation, the internet of things (IoT), the use of big data, and other modern technologies and processes to promote efficiency and increase production in the face of rising populations and climate change. However, horizontal farming may be limited in its ability to integrate certain aspects of these modern technologies and processes. Due to the requirement of large tracts of land, the integration of technologies such as robotics, artificial intelligence, and machine learning systems may require production of large communication networks, dispersed sensors, and other infrastructure. In addition, equipment such as vehicles, drones, and robots must be mobile to cover the tracts of land to monitor crops, detect and treat for infestations and disease, and harvest.

An alternative approach may be to supplement horizontal farming with vertical farming techniques, including but not limited to small-scale urban farming/gardening systems. Various vertical farming/gardening systems have been proposed that range from relatively small vertical gardening systems that include outdoor stationary walls with shelves for crops to relatively large vertical farming systems that include multi-story indoor complexes having multiple tiers of crops grown with artificial lighting. These types of vertical farming/gardening systems may be more amenable to implementation of modern technologies and processes relative to traditional horizontal farming processes. However, increasing the sophistication of existing vertical farming/gardening systems may require considerable capital and education which may reduce the likelihood of participation by individual consumers.

The United States Department of Agriculture (USDA) estimates that about 30 to about 40 percent of food loss happens at the retail and consumer levels. Dehydration of vegetables and fruits at the edge of self-life may reduce waste. However, urban farmers may not have access to a horizontal surface with a dust-free environment and high enough temperatures for fast dehydration to occur. Most growers, consumers, and retailers, including street-side stall owners, lack education-related food dehydration and appropriate devices. In African nations, post-harvesting waste of fruits and vegetable has been reported to approach 50 percent.

In view of the above, it would be desirable if sophisticated, modern vertical farming/gardening systems and/or methods were available that were capable of increasing food production efficiency, reducing adverse impacts of food production, and reducing barriers to individual and/or small community participation in food production.

BRIEF DESCRIPTION OF THE INVENTION

The present invention provides vertical farming/gardening systems and methods of growing plants therewith that utilize various advanced technologies and are capable of promoting food production efficiency, reduce adverse impacts of food production, reduce barriers to individual and/or small community participation in food production, and/or reduce vegetable and fruit waste through dehydration for later consumption.

According to one nonlimiting aspect of the invention, a vertical farming/gardening system includes a track defining a path in which a change in elevation occurs along the path, buckets pivotally secured to the track and configured to travel along the path of the track, and a moving mechanism for moving the buckets along the path of the track. At least a first bucket of the buckets has a cavity containing either a growing medium capable of supporting plants growing within the cavity or a solar collector for dehydrating plants within the cavity. One or more service stations located along the path of the track are configured to perform one or more actions on the growing medium or the plants within the cavity of the first bucket as the first bucket travels along the path of the track adjacent to the one or more service stations. One or more sensors are configured for analyzing the growing medium or the plants within the cavity of the first bucket. A master control unit is configured to control the travel of the buckets along the path of the track, receive and store data collected by the one or more sensors, analyze the data received from the one or more sensors to monitor conditions of the growing medium or the plants within the cavity of the first bucket, and control the one or more service stations to perform the one or more actions on the growing medium or the plants based on the conditions of plants growing in the growing medium or the plants within the cavity of the first bucket.

Another nonlimiting aspect of the invention includes a method of growing plants with a vertical farming/gardening system of the type disclosed above. The method includes planting plants in the plant beds of the buckets, autonomously or semi-autonomously operating the vertical farming/gardening system with the master control unit such that the plants grow in the plant beds, and harvesting produce from the plants.

Other particular but nonlimiting aspects of the invention include chain-mounted hydroponic-based growing systems and methods that offer energy savings. A solar energy powering feature enables the systems to be used in remote areas without grid power and offers the capability of reducing total energy consumption.

Technical effects of vertical farming/gardening systems and methods as described above preferably include the ability to promote urban farming/gardening operations maintained by companies, communities, and/or individuals and promote efficient, cost-effective, and low-labor production of fresh produce, preferably organic produce, that can supplement the local and/or global food supply. Additionally, systems and methods as described above can be used to support the implementation of urban metabolism (UM) and its related STEM (science, technology, engineering, and mathematics) education.

Other aspects and advantages of this invention will be appreciated from the following detailed description.

DETAILED DESCRIPTION OF THE INVENTION

Figure 1:
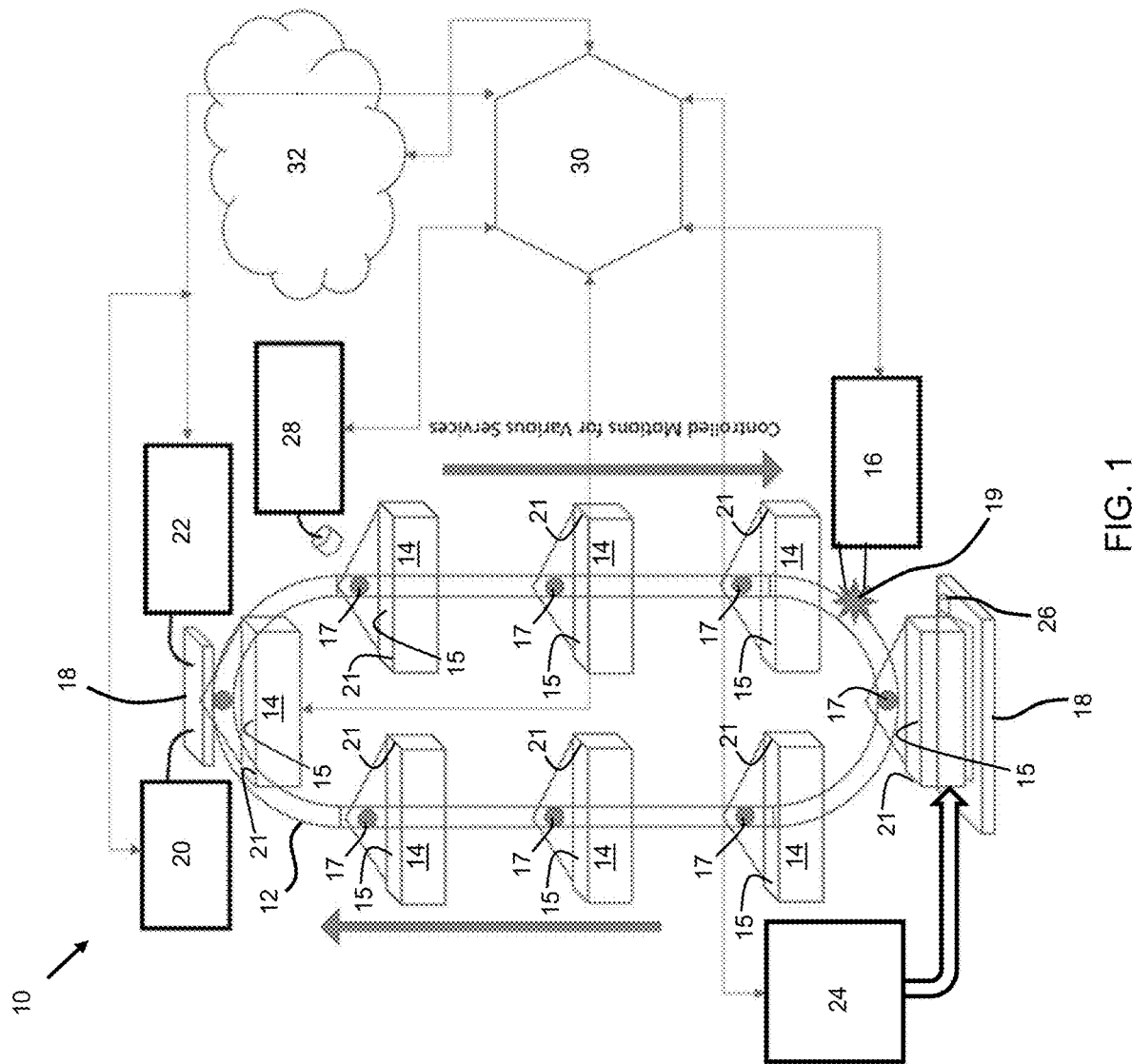
FIG. 1 schematically represents a first embodiment of a vertical farming/gardening system having an oval-shaped track in accordance with certain nonlimiting aspects of the invention.

The intended purpose of the following detailed description of the invention and the phraseology and terminology employed therein is to describe what is shown in the drawings, which include the depiction of one or more nonlimiting embodiments of the invention, and to describe certain but not all aspects of what is depicted in the drawings, including the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended claims, and not the detailed description, are intended to particularly point out subject matter regarded to be aspects of the invention, including certain but not necessarily all of the aspects and alternatives described in the detailed description.

Urban dwellers often live in locations with little or no space that is practical for horizontal farming/gardening. In addition, due to modern lifestyles that may involve time-consuming activities such as traveling and working, individuals may have relatively little time available for growing crops. Vertical farming and/or gardening systems disclosed herein are intended to promote urban farming/gardening through utilization of modern technologies and processes. Such technologies and processes may include, but are not limited to, automation, innovative materials, Internet of Things (IoT) platforms, cloud-computing services, artificial intelligence, machine learning, and edge computing. These technologies and processes may be used by the systems disclosed herein to provide autonomous or semi-autonomous attendance of crops from planting through harvesting. These systems preferably allow users to engage with their farms/gardens through digital services. The system may have a modular structure that can be adapted to an owner's budget.

Referring initially to FIG. 1, a nonlimiting first embodiment of a vertical farming/gardening system 10 is presented that is capable of growing plants in various locations, including urban environments. The system 10 includes a fixed (i.e., immobile or nonmoving) track 12 configured to be secured to a dedicated support frame or a wall of an existing structure, as nonlimiting examples, a commercial, municipal, industrial, or residential building. In this embodiment, the track 12 defines a path that has a continuous and generally oval shape that is elongated in a vertical direction so that a change in elevation occurs along the path of the track 12. However, this configuration is merely exemplary and it should be understood that the track 12 may have various other configurations including both continuous and noncontinuous tracks of various shapes and sizes. As used herein, continuous tracks are defined as tracks having a closed shape in which all points along the track may be repeatedly passed by traveling in a direction (e.g., clockwise or counterclockwise) along the path of the track. In contrast, noncontinuous tracks are defined as tracks having an open shape in which all points along the path of the track may only be passed once when traveling in one direction along the path of the track.

A plurality of containers or buckets 14 are secured to and along the track 12 so as to be configured to travel along the path of the track 12. Each bucket 14 includes one or more walls that define an interior cavity 15 and an opening 21 at an upper portion of the bucket 14. The interior cavity 15 is configured for receiving a growing medium (as a nonlimiting example, soil) therein to define what is referred to herein as a plant bed. The plant beds are configured for supporting the growth of plants therein and, as such, are configured to provide the plants with access to natural and/or artificial light, at least temporarily retain water for the plants, and provide any necessary nutrients for growth of the plants.

The buckets 14 may be open to the surrounding environment at their openings 21 or may include transparent or semi-transparent covers (not shown) over the openings 21 to protect the plants growing in the plant beds thereof. The covers may have various shapes and sizes, a particular but nonlimiting example being a dome-shaped cover. The covers may provide various benefits such as reducing access of pests and/or disease to the plants and/or promoting the control of temperatures within the bucket cavities 15 and/or the plant beds.

In certain embodiments, one or more walls of the buckets 14 may include phase-change materials configured to absorb and store heat from the atmosphere during the day (e.g., sunlight and atmospheric temperature) and release the heat to the growing medium at night and thereby promote more stable temperatures for roots of the plants growing in the plant beds of the buckets 14.

A moving mechanism 16 is provided that is configured for individually moving the buckets 14 along the path of the track 12. Various types of devices and equipment may be used for the moving mechanism 16. In this embodiment, the moving mechanism 16 is schematically represented as including a set of wheels 17 configured to move within and be guided by rails of the track 12, and a cogwheel 19 configured for moving the wheels 17 along the track 12. The moving mechanism 16 may further comprise a motor-driven chain coupled to the cogwheel 19 for driving the cogwheel 19. Such a motor may be a solar-powered electric motor, though other types of motors are foreseeable. The individual buckets 14 are represented as being pivotally attached to the track 12 such that the plant beds remain substantially upright relative to gravity as the buckets 14 travel about the track 12.

The system 10 includes one or more service stations 18 located along the path of the track 12 that are each configured to perform one or more actions on the plant beds or plants growing within the buckets 14 as the buckets 14 travel along the path of the track 12 adjacent the respective service station(s) 18. Such actions may include but are not limited to supplying water to the plants in the plant beds, treating the plants for disease or pests, and applying fertilizer to the plant beds. For example, the system 10 of FIG. 1 is represented as having a service station 18 located at an upper extent of the track 12 in combination with a water controller 20 that is configured to operate drip valves of a water misting system for watering the plants, and a disease and insect spray controller 22 configured to apply chemicals to the plants for fungi and insect treatments. In certain embodiments, the service stations 18 may be configured to harvest produce grown on the plants. For example, the system 10 of FIG. 1 is represented as having a service station 18 located at a lower extent of the track 12 in combination with automated equipment 24, for example, a robot, a robotic arm, etc., configured to separate and retrieve produce from the plants growing in the plant beds. Robots, robotic arms, and other automated equipment may also be used for maintenance and other tasks conventionally performed by human labor.

Water may be supplied to the plants in the plant beds from various sources, including local municipal water supplies and/or storage containers. In certain embodiments, the system 10 may include a rainwater collection system (not shown) configured to collect rain water and supply the rain water to at least one of the service stations 18 that is configured to supply water to the plant beds. The system 10 of FIG. 1 includes a liquid collection unit 26 configured to collect water from the buckets 14 and redistribute at least some of the collected water back into the system 10 to be supplied to the plant beds. Optionally, the system 10 may include a filtration system configured to filter the water prior to delivery to the plants. In certain embodiments, at least one of the service station(s) 18 (in this nonlimiting example, the lowermost service station 18) is located at ground level and accessible by an individual. The provision of a ground-level service station 18 allows for easy human access to the buckets 14 for maintenance as well as manual farming/gardening tasks.

The system 10 of FIG. 1 preferably includes one or more sensors configured for sensing physical stimulus relating to the plant beds or the plants growing therein and generating data based on the sensed stimulus. Various types of sensors may be incorporated into the system 10. Nonlimiting examples of suitable sensors may include moisture sensors, acidity sensors, heavy metal sensors, and cameras (e.g., visual, near-infrared, thermal, etc.). As a nonlimiting example, FIG. 1 represents the system 10 as including a digital camera 28 as a sensor for visually observing the plants as they pass the camera 28.

The system 10 of FIG. 1 is schematically represented as including a master control unit 30 that is functionally coupled to various components of the system 10 and configured to control some or all of the components. For example, the master control unit 30 may be configured to control the travel of the buckets 14 along the path of the track 12 through the moving mechanism 16, receive and store data collected by the sensor(s) (such as the camera 28), analyze the data received from the sensor(s) to monitor conditions of the plants growing in the plant beds, and control the service station(s) 18 and their associated equipment (such as the water controller 20, spray controller 22, and automated equipment 24) to perform actions on the plant beds or plants growing therein based on the conditions of the plants growing in the plant beds.

In certain embodiments, the master control unit 30 may perform predictions related to health and growth of the plants in the plant beds based on the analysis of the data received from the sensor(s). One or both of the analyses and predictions may be performed using artificial intelligence, machine learning, and/or edge computing. Such analyses and predictions can promote determination, accuracy, and timing of plant maintenance. For example, the master control unit 30 may perform operations intended to optimize plant health (e.g., optimize watering, sun exposure, soil nutrients, etc.), prevent or reduce disease and infestations, proactively address changes in plant health or predictions of disease or infestations, predict produce yields, and/or generate harvesting schedules.

As represented in FIG. 1, the master control unit 30 may be configured to upload data, including data related to the conditions of the plants growing in the plant beds, to a remote database such that the data is accessible to a software application operating on the database or on one or more remote computing devices, such as one or more servers. Using the uploaded data, the software application may generate a virtual representation 32 of the plant beds and/or the vertical farming/gardening system 10. For example, the software application may create a digital "twin" of the system 10 that may include the track 12, buckets 14, and plants growing in the plant beds. Preferably, the virtual representation 32 can be updated periodically or in real-time such that it accurately represents the status of the system 10 and the plants g rowing therein.

The software application and/or the master control unit 30 may use the virtual representation 32 to perform analysis, modeling, and/or predictions relating to the plant growth and health. In addition, the software application may provide access of the virtual representation 32 to one or more users, such as individuals who own, operate, and/or maintain the vertical farming/gardening system 10. In such embodiments, the user(s) may be able to remotely monitor the system 10 and the plants growing therein, make and implement system operation decisions, access prepared harvest schedules, and/or adjust setting of the master control unit 30 such as a level of autonomy provided to the master controller in regards to operating the system 10. For example, the master control unit 30 may be allowed to operate the system 10 independently, may be required to provide recommended actions to the user for approval, may be limited to executing actions at the direction of the user, or combinations thereof.

Figure 2:
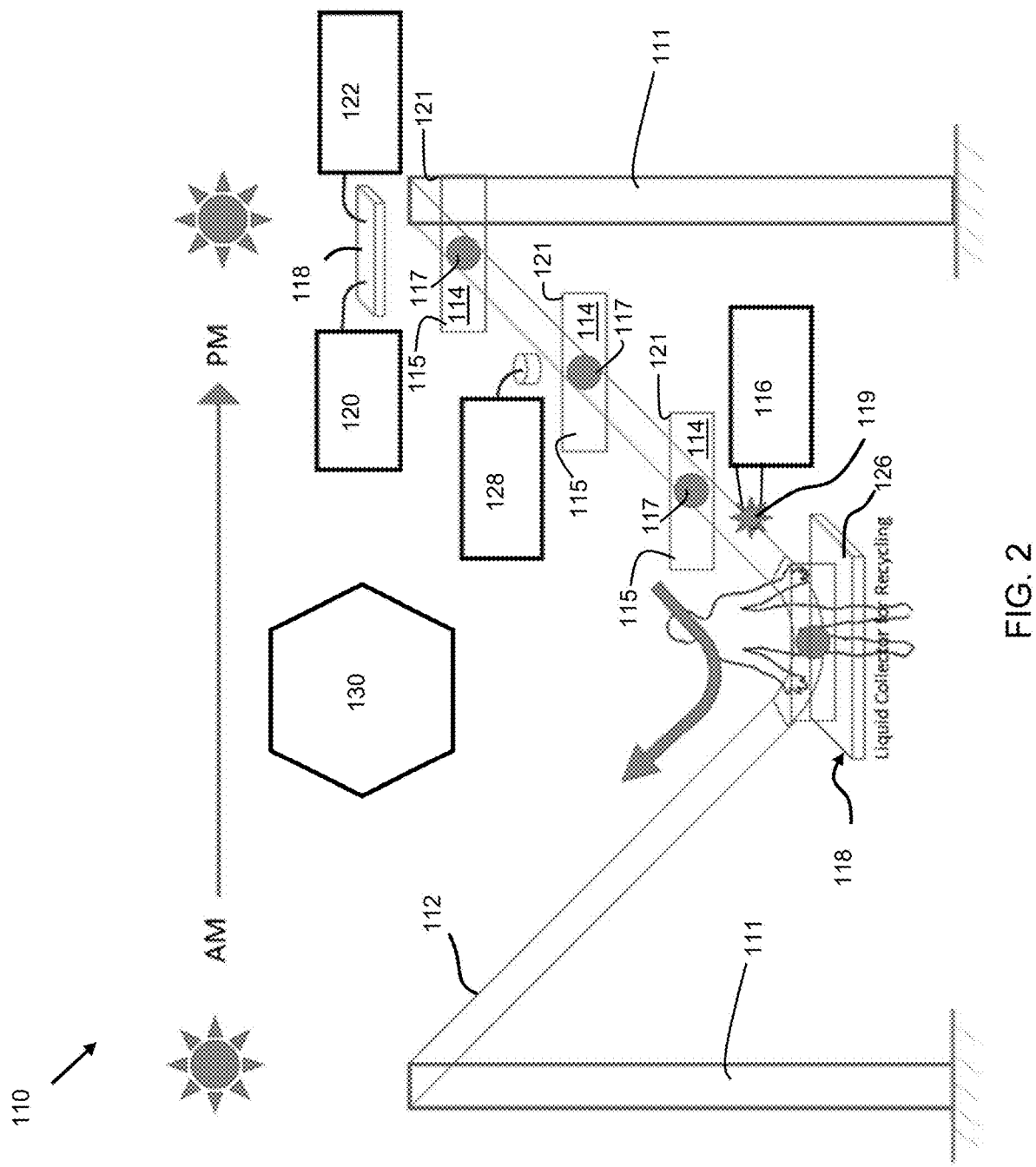
FIG. 2 schematically represents a second embodiment of a vertical farming/gardening system having a noncontinuous track and illustrates a method of sun tracking in accordance with certain nonlimiting aspects of the invention.
Figure 3:
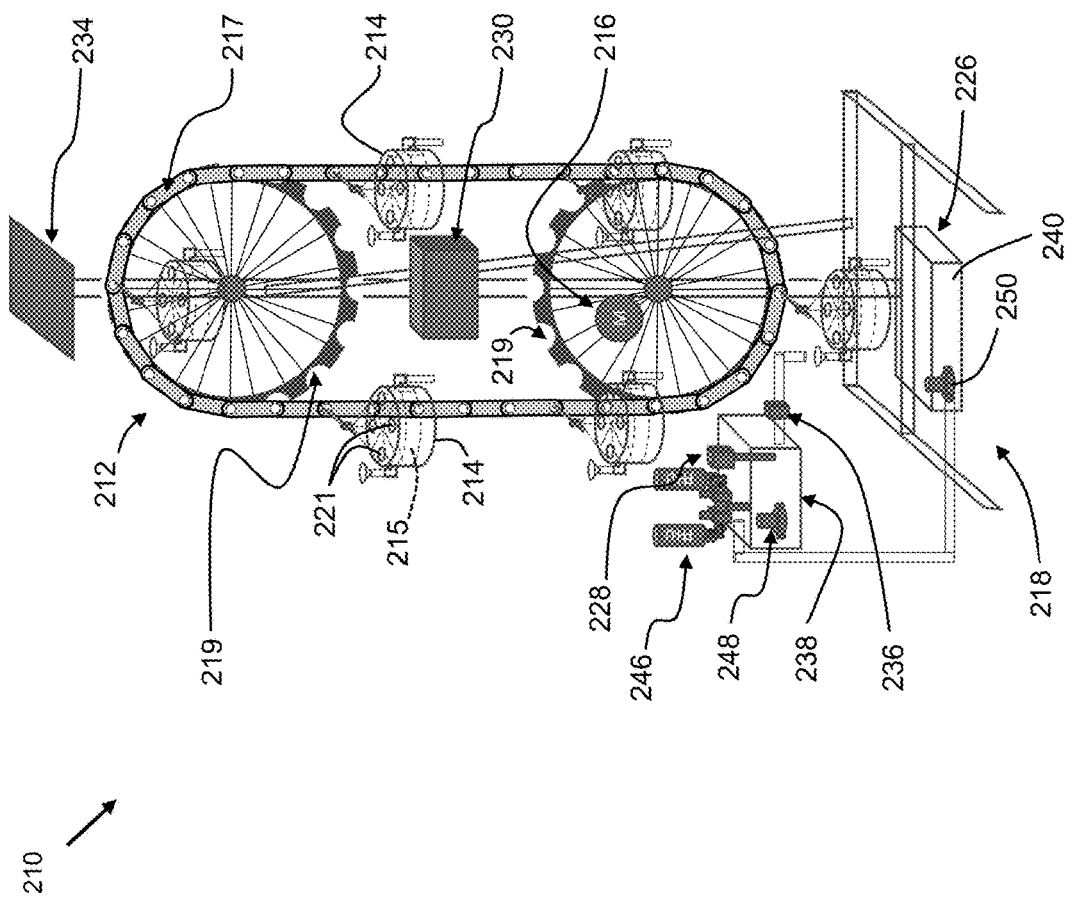
FIG. 3 schematically represents a third embodiment of a vertical farming/gardening system adapted for growing and/or dehydrating plants in accordance with certain nonlimiting aspects of the invention.

Referring now to FIGS. 2 and 3, nonlimiting second and third embodiments of vertical farming/gardening systems 110 and 210 are presented. In view of similarities between the embodiments, the following discussions of the second and third embodiments will focus primarily on aspects of the second and third embodiments that differ from the first embodiment in some notable or significant manner. Other aspects of the second and third embodiments not discussed in any detail can be, in terms of structure, function, materials, etc., essentially as was described for the first embodiment. In FIGS. 2 and 3, consistent reference numbers are used to identify the same or functionally equivalent elements, but with a numerical prefix (1 or 2) added to distinguish the embodiments of FIGS. 2 and 3 from the embodiment of FIG. 1.

Similar to the first embodiment, the system 110 of the second embodiment schematically represented in FIG. 2 includes a fixed track 112 configured to be secured to a frame or a structure 111, buckets 114 pivotally secured to the track 112 and configured for receiving a growing medium to define a plant bed capable of supporting growth of crops therein, a moving mechanism 116 for moving the buckets 114 along a path defined by the track 112, one or more service stations 118 located along the path of the track 112 that are each configured to perform one or more actions on the plant beds or plants growing therein, one or more sensors configured for analyzing the plant beds or the plants growing therein, and a master control unit 130 configured to control the various operations of the system 110.

Unlike the first embodiment, the track 112 of the system 110 is not continuous. Instead, the track 112 defines an open V-shaped path that extends between two spaced apart structures 111 such that, though a change in elevation occurs along the path of the track 112, the path terminates at opposite ends of the track 112 and the master control unit 130 and the moving mechanism 116 are configured to move the buckets 114 in opposite directions along the path (e.g., forward and reverse) between the terminal ends of the track 112. This type of track 112 may be particularly beneficial in locations that are not directly exposed to the sun throughout the day (e.g., southern exposure in the northern hemisphere). In such locations, growth of the plants in the plant beds may be promoted by performing a sun tracking process in which the buckets 114 are moved along the path of the track 112 throughout the day in an attempt to maximize their exposure to sunlight as the sun travels through the sky. At night, the buckets 114 may be returned to their initial positions such that the sun tracking process may be repeated the following day.

Figure 7:
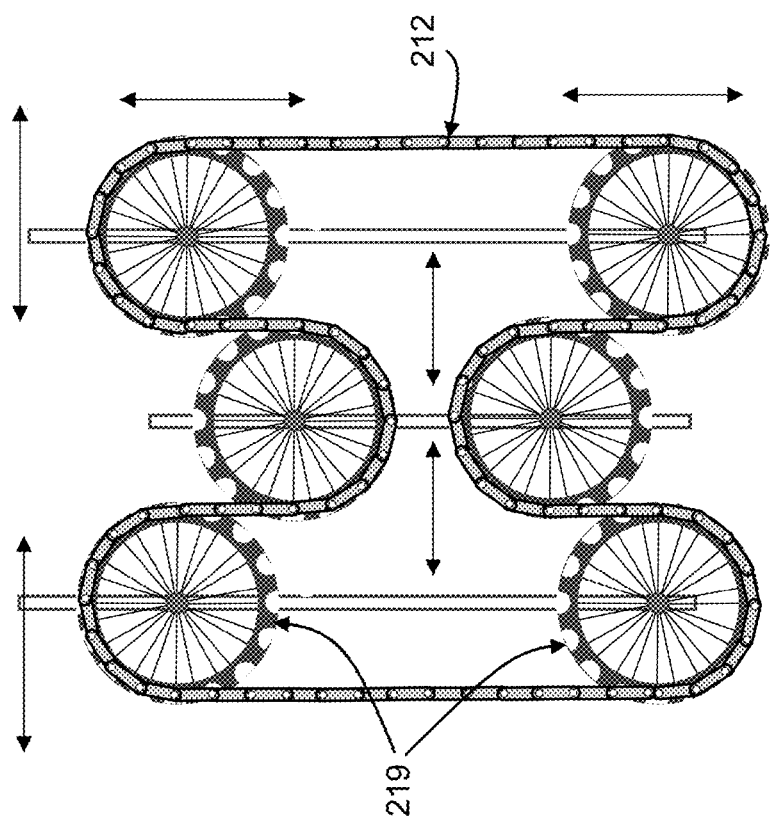
FIG. 7 schematically represents a sprocket and chain configuration adapted to promote the use of available, lighted vertical space in the vertical farming/gardening system of FIG. 3.

In place of the fixed tracks 12 and 112 of FIGS. 1 and 2, the vertical farming/gardening system 210 of the third embodiment schematically represented in FIG. 3 utilizes a moving track 212 that comprises a flexible chain 212 driven by and between a pair of wheels (sprocket) 219. Similar to the prior embodiments, the system 210 includes buckets 214 and a moving mechanism 216 for driving the wheels 219. The buckets 214 are pivotally mounted to the chain 217 so that, by driving the wheels 219 with the moving mechanism 216, the moving mechanism 216 also moves the chain 217 and the buckets 214 attached thereto along an oval-shaped path of the track 212 between the wheels 219. The individual buckets 214 are represented as being pivotally attached to the chain 217 such that the plant beds remain substantially upright relative to gravity as the buckets 214 travel about the path of the chain 217. The chain 217 and wheels 219 may be customized to provide users with easy assembly and options for positioning the buckets 214. FIG. 7 evidences that the configuration of the track 212, and particularly the arrangement of the chain 217 and the number of wheels 219, can be modified and dynamically adjusted during the operation of the system 210 to alter the shape of the path of the chain 217, and in so doing can be altered to better utilize the available lighted vertical space surrounding the system 210.

Figure 5:
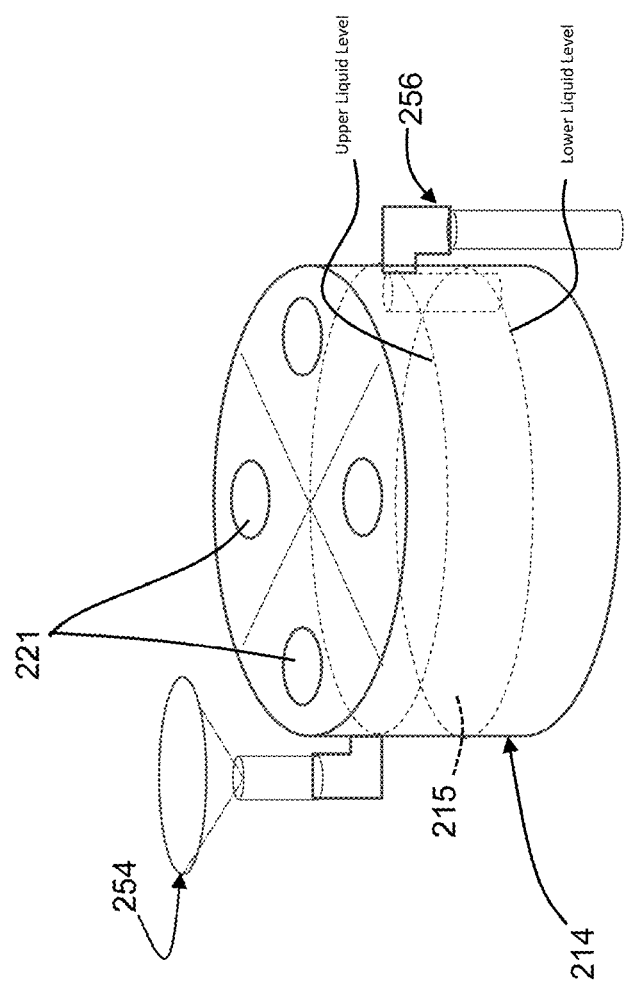
FIG. 5 schematically represents a partial water flushing unit for growing buckets of the vertical farming/gardening system of FIG. 3.
Figure 6:
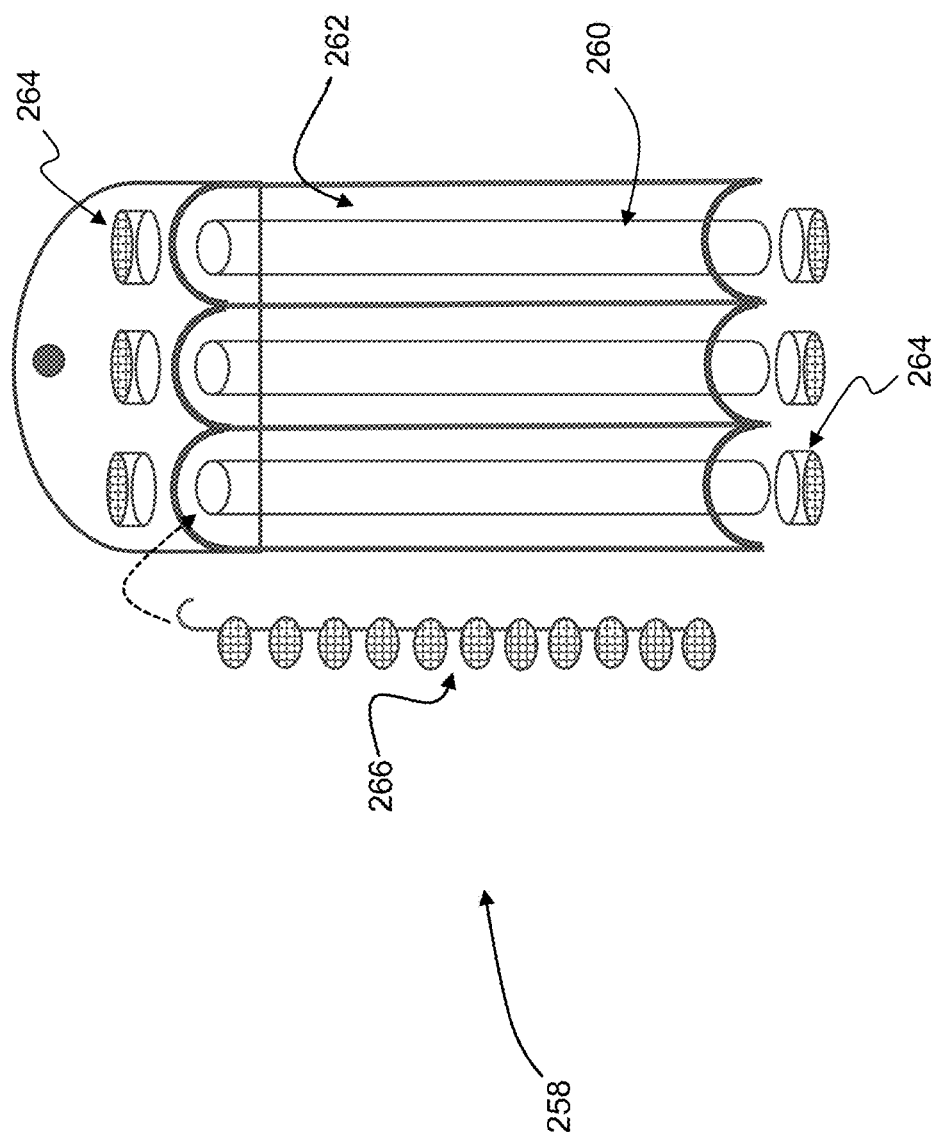
FIG. 6 schematically represents growing/dehydration boxes capable of use with the vertical farming/gardening systems of FIGS. 1 through 3.

The buckets 214 are each represented in FIG. 3 as comprising a single interior cavity 215 exposed by multiple holes 21 in the upper portion of the bucket 214. The system 210 is represented in FIG. 3 as having a hydroponic-based growing configuration in which case the cavities 215 of the buckets 214 contain an appropriate hydroponic growing media. For this purpose, at least some of the buckets 214 are configured as growing boxes, for example, the cavities 215 may be defined by coco (coconut) coir pots, hydroponic pots, or other suitable growing containers. FIG. 5 schematically represents a bucket 214 configured as a growing box for receiving growing media to define plant beds capable of supporting growth of crops therein. Alternatively or additionally, the system 210 may be configured to dehydrate plants (which as used herein includes vegetables and fruits produced by plants) located within the cavities 215, in which case at least some of the buckets 214 are configured as dehydration boxes for dehydrating plants, vegetables, fruits, etc., with concentrated solar energy, for example, generated by a solar panel 234. FIG. 6 schematically represents a bucket 214 configured as a dehydration box for dehydrating plants, vegetables, fruits, etc., within the cavities 215 of the bucket 214.

Figure 4:
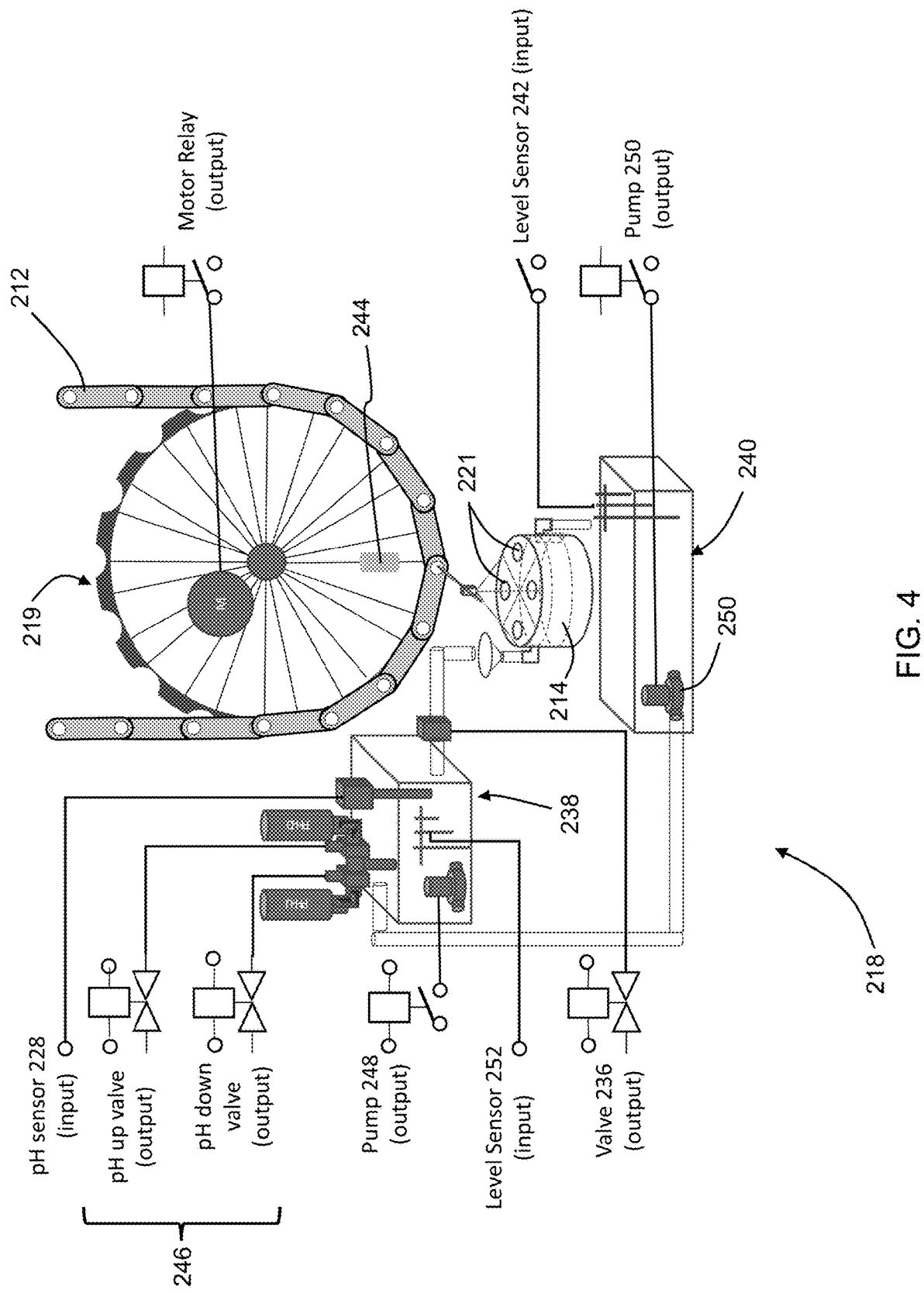
FIG. 4 schematically represents a hydroponic system capable of use with the vertical farming/gardening systems of FIGS. 1 through 3.

FIG. 3 schematically represents the system 210 as including at least one service station 218 located along the path of the chain 217 to perform one or more actions on the plant beds or plants growing therein. In conventional hydroponic systems, growing pots are stationary and a pH-balanced aqueous fertilizer solution passes around the roots of plants. In the system 210 of FIG. 3, the buckets 214 are mobile and move along the path of the chain 217, and the service station 218 of the system 210 in FIG. 3 is represented as a closed-loop hydroponic service station 218 configured to deliver and maintain a pH-balanced aqueous fertilizer solution within the cavities 215 of the buckets 214. For this purpose, the system 210 is represented in FIG. 3 as comprising at least one sensor 228 configured for analyzing the plant beds or the plants growing therein, and a master control unit 230 configured to control the service station 218 and preferably various other operations of the system 210. Additional details of the service station 218 are shown in FIG. 4, including various outputs of components of the system 210 that are operated on and by the master control unit 230. While represented as being associated with the system 210 of FIG. 3, the systems 10 and 110 of FIGS. 1 and 2 could similarly incorporate a closed-loop hydroponic service station of a type schematically represented in FIGS. 3 and 4.

As noted above, the closed-loop hydroponic service station 218 maintains an appropriate pH balance and fertilizer levels in a hydroponic water solution for use by plants growing in the cavities 215 of the buckets 214. In the nonlimiting embodiment shown, a gravity-fed valve 236 fills each bucket 214 with the water solution drawn from a conditioning tank 238 at predetermined intervals when each bucket 214 is positioned at the service station 218, which can be sensed by a proximity sensor 244 represented in FIG. 4. Gravity feeding is possible because the conditioning tank 238 is mounted at an elevation above the service station 218. The service station 218 is configured to draw water from a bucket 214 located at the service station 218. The water drawn from a bucket 214 is at least partially depleted of nutrients due to use by the plants in the bucket 214. This nutrient-depleted water flows into a liquid collection unit 226 that comprises a receiving tank 240 located underneath the service station 218. A level sensor 242 in the receiving tank 240 initiates a pump 250 to transfer the nutrient-depleted water to the conditioning tank 238 and monitors the amount of water discharged from each bucket 214 for health monitoring. In the embodiment shown, the sensor 228 is a pH sensor whose output is monitored by the master control unit 230, which controls a pH adjustment unit 246 to periodically adjust the pH level of the water within the conditioning tank 238. The master control unit 230 also controls an aerator pump 248 to add oxygen to the water while in the conditioning tank 238. FIG. 4 represents the use of a level sensor 252 to monitor the water level in the conditioning tank 238.

FIG. 5 schematically represents further details of a bucket 214, including a funnel 254 that receives the water solution from the conditioning tank 238 via the valve 236, and a discharge pipe 256 through which water is drained from the bucket 214 to the receiving tank 240. In combination, the funnel 254 and discharge pipe 256 provide a partial water flushing arrangement for the bucket 214. Openings 221 in the upper portion of the bucket 214 allow for the insertion of seeds or plants in the bucket cavity 215. The nutrients in the bucket 214 provide space for root growth. The placement depth of the entrance to the discharge pipe 256 within the cavity 215 determines a lower level for the water within the cavity 215 and the percentage of the total water volume that will be flushed from the cavity 215. This arrangement avoids the need for continuous nutrient pumping of standard hydroponic systems, thus saving energy.

As noted above, FIG. 6 schematically represents a concentrated solar dehydration attachment 258 for providing an alternative bucket configuration that enables a bucket 214 to serve as a dehydration box for dehydrating plants, vegetables, fruits, etc., within the cavity 215 of the bucket 214. The attachment 258 is preferably capable of being mounted to the upper portion of a bucket 14, 114, and 214 of any of the embodiments of FIGS. 1, 2, and 3. The attachment 258 includes dehydration tubes 260 in which plants, vegetables, fruits, etc., can be placed, and concave solar collectors 262 that collect and concentrate solar energy (for example, from the solar panel 234 in FIG. 3) to achieve higher temperatures within the tubes 260 than would be possible with a flat reflector. High-temperature dehydration uses no chemicals and preservatives, allows easy storage, contains nutrients intact, and reduces waste. Air flows into and out of the tubes 260 through ventilation caps 264 that serve as barriers to undesirable ingress of insects and other matter that might otherwise contact the plants, vegetables, and/or fruits being dried within the tubes 260. An optional retainer insert 266 can be placed within the tubes 260 to better retain sliced vegetables or fruits placed in the tubes 260.

The vertical farming/gardening systems 10, 110, and 210 described above provide for methods of growing plants that may include planting plants or seeds in the plant beds of the buckets 14, 114, and 214, autonomously or semi-autonomously operating the vertical farming/gardening systems 10, 110, and 210 with the master control units 30, 130, and 230 such that the plants grow in the plant beds and produce are harvested from the plants. The methods may include autonomously monitoring the conditions of the plants with the master control units 30, 130, and 230, for example, by analyzing the data provided by the one or more sensors 28, 128, and 228, and autonomously controlling the service stations 18, 118, and 218 to perform one or more actions on the plant beds or the plants growing therein including, but not limited to, supplying water to the plants, treating the plants for disease or pests, and applying fertilizer to the growing medium and/or to the hydroponic water solution within the cavities 15, 115, and 215. Harvesting the produce may be accomplished manually by human labor, or may be completed using automated processes. For example, the produce may be harvested using automated equipment (e.g., 24 in FIG. 1) controlled by the master control units 30, 130, and 230.

The vertical farming/gardening systems 10, 110, and 210 may provide several advantages over traditional horizontal farming/gardening practices. The vertical orientation of the systems 10, 110, and 210 may increase the horizontal to vertical surface ratio relative to horizontal farming/gardening allowing for the growth of more crops within a defined area, may improve production due to sun tracking (e.g., longer hours of sun exposure), may allow for self-irrigate (preferably with rainwater when available), and may provide for recycling of water and soil nutrients (e.g., liquid collection units 26, 126, and 226). The capability for moving the buckets 14, 114, and 214 with the plants therein may provide several benefits including a reduction in a quantity of necessary sensors (e.g., a single sensor can observe all of the plants as they pass), a reduction in human labor (e.g., unnecessary to walk through a field), and a reduction in cost of automation (e.g., robotic arm is stationary and therefore less complex). The incorporation of artificial intelligence, machine learning, and edge computing may allow for improvements to efficiency reducing resource and labor costs, may reduce yield losses due to infestations of insects and diseases, and may promote human labor scheduling efficiency. Optionally, the use of bucket covers and/or phase-change materials may allow for more consistent control over soil temperature. The systems 10, 110, and 210 as a whole have a significant potential to reduce human labor associated with farming/gardening. For example, harvesting may be performed by robots, robotic arms, or other automation equipment rather than human workers. Even if human labor is used, a single worker may be able to serve several systems 10, 110, and 210 from a single location with proper coordination of the buckets 14, 114, and 214 of the systems 10, 110, and 210. Embodiments that include a virtual representation of any one of the systems 10, 110, and 210 (for example, 32 in FIG. 1) may promote ease of farm/garden operation and management.

As previously noted above, though the foregoing detailed description describes certain aspects of one or more particular embodiments of the invention, alternatives could be adopted by one skilled in the art. For example, the vertical farming/gardening systems 10, 110, and 210 and their components could differ in appearance and construction from the embodiments described herein and shown in the figures, functions of certain components of the vertical farming/gardening systems 10, 110, and 210 could be performed by components of different construction but capable of a similar (though not necessarily equivalent) function, and various materials could be used in the fabrication of the vertical farming/gardening systems 10, 110, and 210 and/or their components. As such, and again as was previously noted, it should be understood that the invention is not necessarily limited to any embodiment described herein.

The invention claimed is:

1. A vertical farming/gardening system comprising:
a track defining a path in which a change in elevation occurs along the path;
buckets pivotally secured to the track and configured to travel along the path of the track, at least a first bucket of the buckets having a cavity adapted to contain a growing medium capable of supporting plants growing within the cavity;
a dehydration attachment adapted to be mounted to the first bucket to enable the first bucket to serve as a dehydration box, the dehydration attachment comprising a solar collector for dehydrating plants within the cavity of the first bucket;
a moving mechanism for moving the buckets along the path of the track;
one or more service stations located along the path of the track that are each configured to perform one or more actions on the growing medium or the plants within the cavity of the first bucket as the first bucket travels along the path of the track adjacent to the one or more service stations;
one or more sensors configured for analyzing the growing medium or the plants within the cavity of the first bucket; and
a master control unit configured to control the travel of the buckets along the path of the track, receive and store data collected by the one or more sensors, analyze the data received from the one or more sensors to monitor conditions of the growing medium or the plants within the cavity of the first bucket, and control the one or more service stations to perform the one or more actions on the growing medium or the plants based on the conditions of plants growing in the growing medium or the plants within the cavity of the first bucket.

2. The vertical farming/gardening system of claim 1, wherein the track is immobile and fixed to a structure.

3. The vertical farming/gardening system of claim 2, wherein the moving mechanism includes wheels configured to move within and be guided by rails of the track and a cogwheel configured for moving the wheels along the path of the track.

4. The vertical farming/gardening system of claim 1, wherein the track comprises a flexible chain driven by and between at least a pair of wheels, and the buckets are pivotally secured to the flexible chain.

5. The vertical farming/gardening system of claim 4, wherein the moving mechanism rotates the at least one pair of wheels to move the buckets along the path of the track.

6. The vertical farming/gardening system of claim 1, wherein the track and the path thereof are continuous and the moving mechanism is configured to move the buckets along the path of the track.

7. The vertical farming/gardening system of claim 1, wherein the first bucket includes a phase-change material configured to absorb heat from the atmosphere during the day and release heat to the growing medium of the first bucket at night and thereby promote stable temperatures of roots of plants growing in the growing medium of the first bucket.

8. The vertical farming/gardening system of claim 1, wherein at least a first service station of the one or more service stations is configured to supply water to the growing medium of the first bucket.

9. The vertical farming/gardening system of claim 8, wherein the first service station further comprises means for controlling the pH and nutrients in the water.

10. The vertical farming/gardening system of claim 8, wherein the first service station further comprises a liquid collection unit configured to collect water from the first bucket, transfer the water to a conditioning tank where the controlling means controls the pH and nutrients in the water, and return the water to the first bucket.

11. The vertical farming/gardening system of claim 1, wherein at least one of the one or more service stations is configured to apply fungi or insect treatments to the growing medium of the first bucket or the plants therein.

12. The vertical farming/gardening system of claim 1, wherein at least one of the one or more service stations includes automation equipment configured to harvest produce from plants growing in the growing medium of the first bucket.

13. The vertical farming/gardening system of claim 1, wherein the one or more sensors include a moisture sensor, an acidity sensor, a heavy metal sensor, and a digital camera.

14. The vertical farming/gardening system of claim 1, wherein the master control unit performs predictions related to health and growth of plants in the growing medium of the first bucket based on the analysis of the data received from the one or more sensors.

15. The vertical farming/gardening system of claim 14, wherein the predictions are performed using artificial intelligence, machine learning, and/or edge computing.

16. The vertical farming/gardening system of claim 14, wherein the master control unit generates a harvesting schedule based on the predictions.

17. The vertical farming/gardening system of claim 1, wherein the master control unit moves the buckets along the path of the track during the day for sun tracking.

18. The vertical farming/gardening system of claim 1, wherein the master control unit uploads data to a software application operating on a remote computing device related to the conditions of plants growing in the growing medium of the first bucket, wherein the software application generates a virtual representation of the vertical farming/gardening system based on the uploaded data that is accessible by an individual.

19. The vertical farming/gardening system of claim 1, wherein the dehydration attachment comprises dehydration tubes for receiving plants and the solar collector collects and concentrates solar energy to increase temperatures within the tubes.

20. A method of growing plants with the vertical farming/gardening system of claim 1, the method comprising:
- planting plants in the growing medium of the first bucket;
- autonomously or semi-autonomously operating the vertical farming/gardening system with the master control unit such that the plants grow in the growing medium;
- autonomously monitoring the conditions of the plants with the master control unit;
- autonomously controlling the one or more service stations to perform one or more actions on the growing medium of the first bucket or plants growing therein including supplying water, treating for disease or pests, and applying fertilizer; and
- harvesting produce from the plants.

* * * * *